Sept. 15, 1925.
J. A. SCHARF
SHOVEL AND DREDGE
Filed Dec. 30, 1924
1,554,131
5 Sheets-Sheet 1
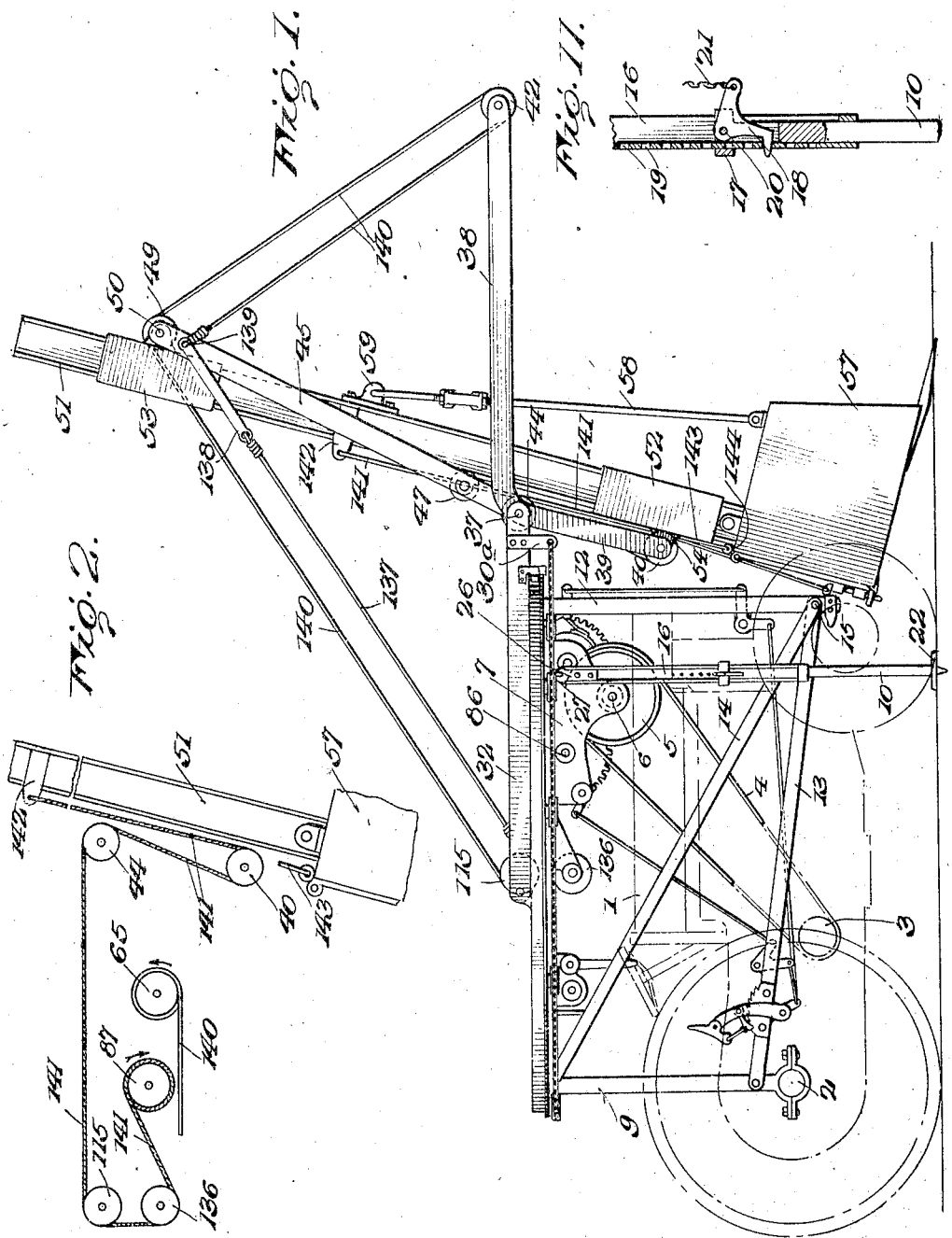
WITNESSES:
INVENTOR,
John A. Scharf.
BY
ATTORNEYS.

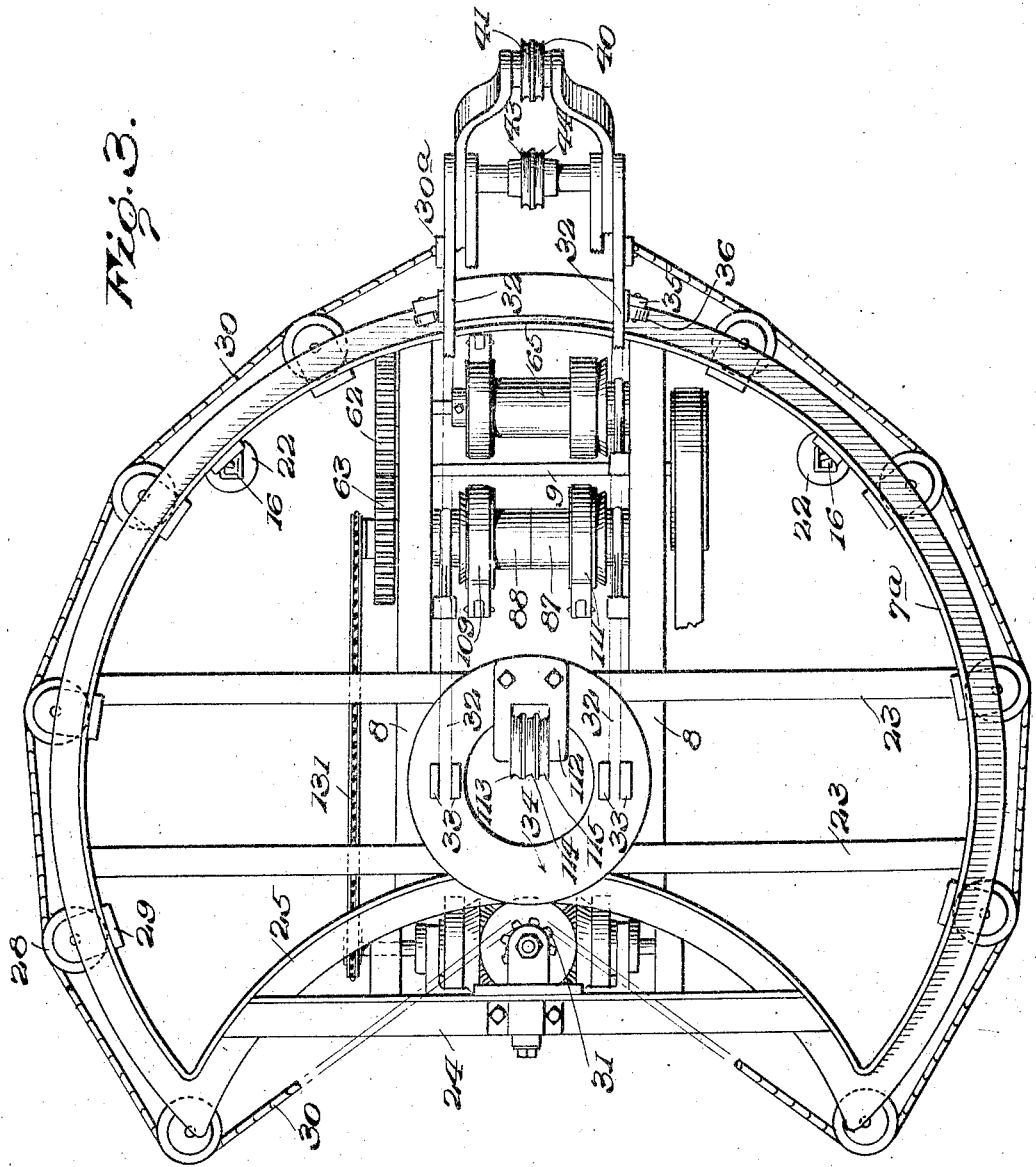

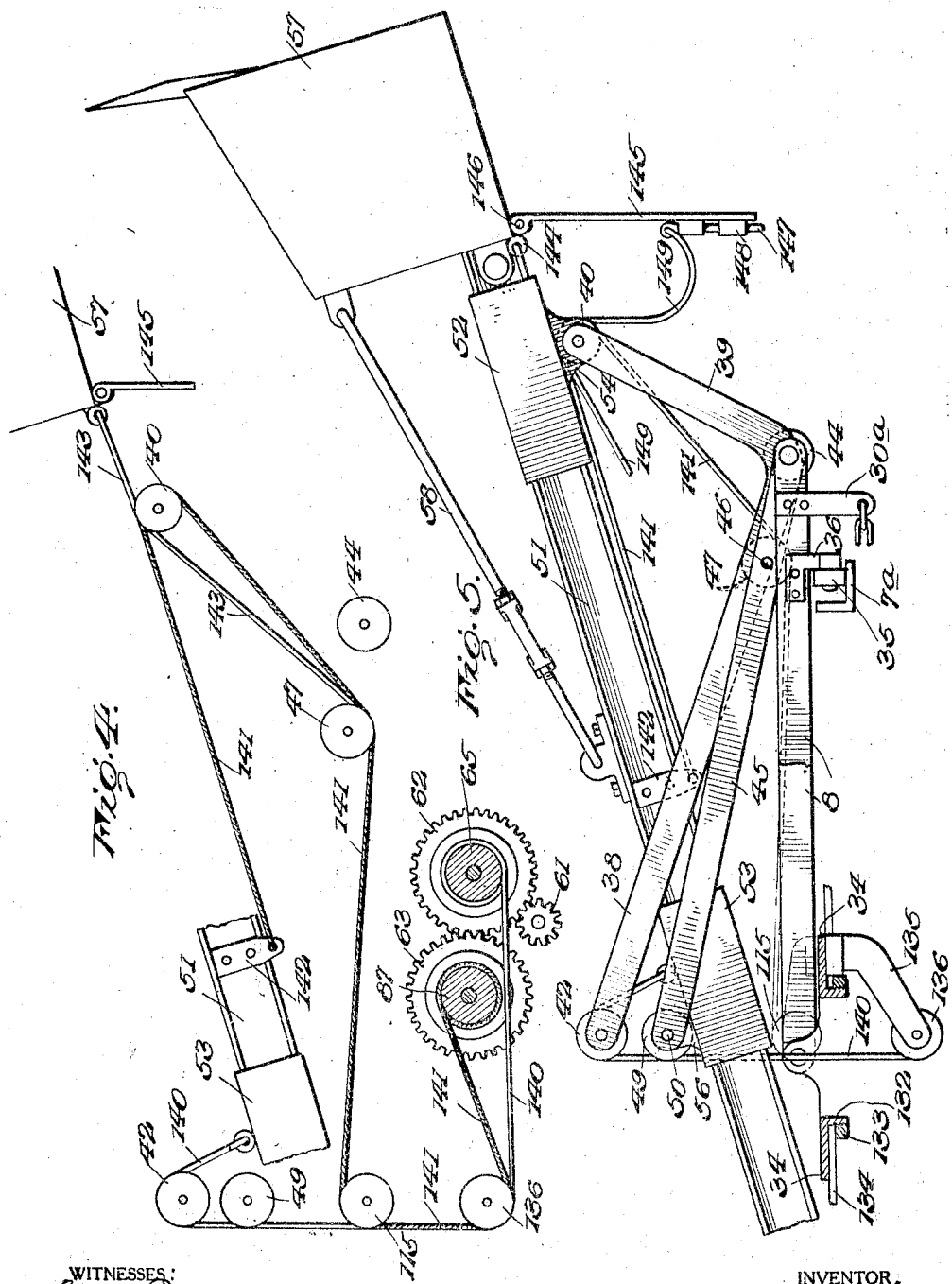

Sept. 15, 1925.
J. A. SCHARF
SHOVEL AND DREDGE
Filed Dec. 30, 1924
1,554,131
5 Sheets-Sheet 4
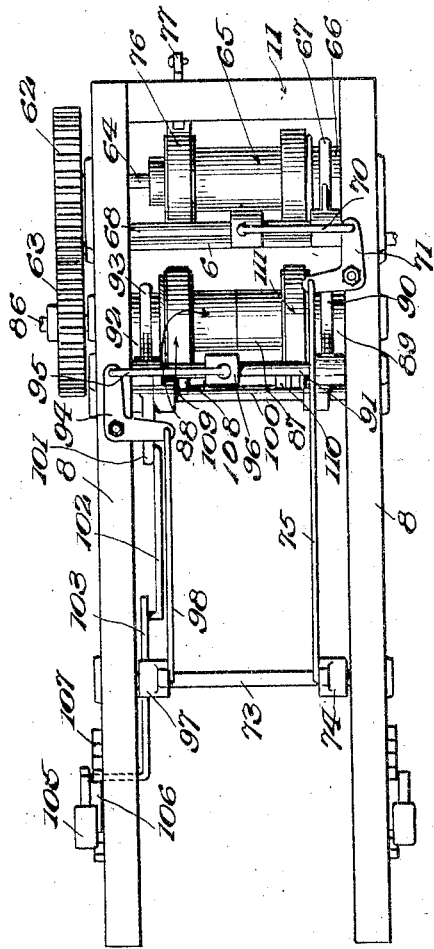
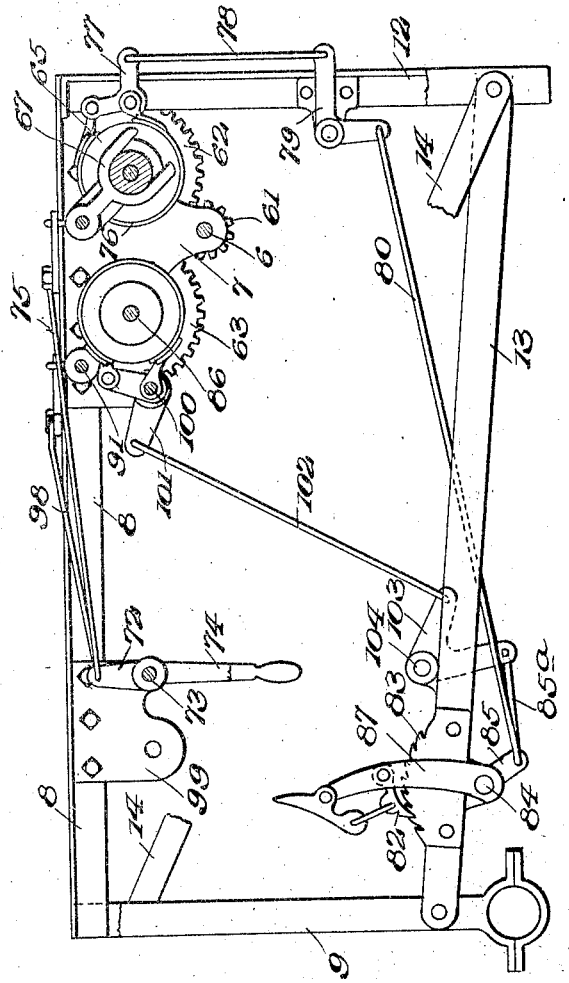
WITNESSES:
INVENTOR,
John A. Scharf.
BY
ATTORNEYS.

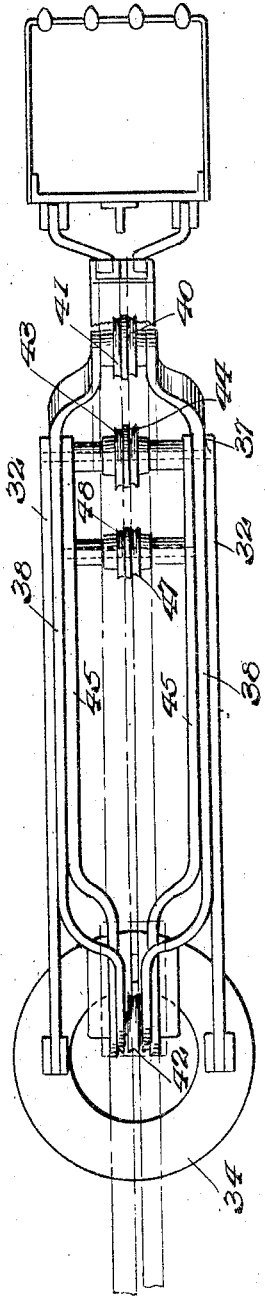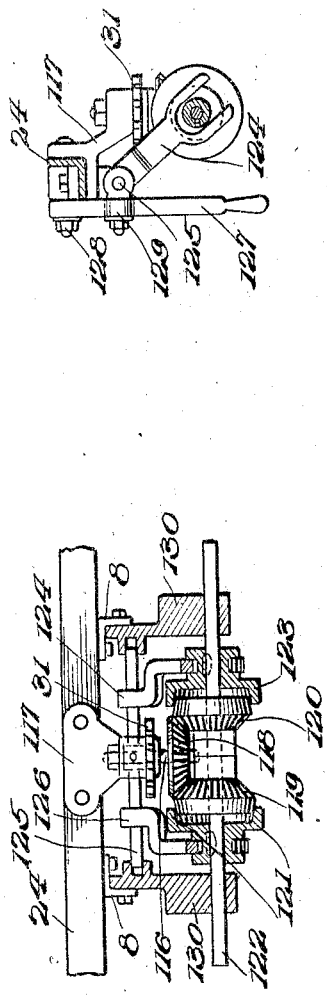

Patented Sept. 15, 1925.

UNITED STATES PATENT OFFICE.

JOHN ADAM SCHARF, OF RICHWOOD, OHIO.

SHOVEL AND DREDGE.

Application filed December 30, 1924. Serial No. 758,963.

*To all whom it may concern:*

Be it known that I, JOHN ADAM SCHARF, a citizen of the United States, and a resident of Richwood, in the county of Union and State of Ohio, have invented certain new and useful Improvements in Shovels and Dredges, of which the following is a specification.

This invention relates to a power shovel or dredge for light and rapid work and has for its object the provision of device which may be incorporated as a unitary structure in a tractor or which may be mounted on skids and driven by a stationary engine.

Another object of the invention is the provision of a power shovel for excavating or loading in the process of road or building operations or for aiding in the handling of agricultural products and in which angularly bent arms cooperate with main shovel supporting beams to elevate the shovel and place the same in a dumping position.

A further object of the invention is the provision of a power shovel having supporting beams cooperating with tilting arms for properly elevating a shovel, the beams and arms folding into a compact unit at the completion of the raising operation, with mechanism for swinging the shovel to either side of the main support for the shovel.

A still further object of the invention is the provision of an overhead structure for aiding in elevating the shovel which constantly changes its angle of fulcruming in order to place the load at points along the main support of the shovel to prevent tilting of the support.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view in elevation of the power shovel shown mounted on a tractor.

Figure 2 is a fragmentary view showing the disposition of the driving cables for the shovel.

Figure 3 is a plan view of an attachment for operating a shovel.

Figure 4 is a fragmentary view showing the position of the forward driving cables when the shovel has been elevated.

Figure 5 is a fragmentary side view of the shovel unit in elevated position.

Figure 6 is a plan view of the operating mechanism of the shovel unit.

Figure 7 is a side view of the operating mechanism.

Figure 8 is a plan view of the shovel unit.

Figure 9 is a detailed view partly in section of the driving mechanism for the turntable.

Figure 10 is a vertical section showing a detail of the clutch mechanism for the turntable.

Figure 11 is a vertical section showing a detail of the adjustable legs for the supporting frame.

Referring more particularly to the drawings, 1 designates a tractor having a rear axle housing 2 and a driving drum 3. A belt 4 driven from drum 3 drives a drum 5 mounted on a shaft 6. The shaft is supported in bearings carried by plates 7 depending from a pair of horizontal beams 8.

These beams form the general support for the lifting mechanism and are maintained in a predetermined elevated position at the rear by a pair of legs 9 clamped to the axle housing 2 and a pair of adjustable legs 10. A transverse bar 11 connects the front ends of the beams 8 and a pair of vertically disposed bars 12 are supported from said beams at this point. A pair of brace bars 13 and 14 are secured at 15 to the lower end of each bar 12 at each side of the tractor. Bar 13 extends rearwardly and is connected to a leg 9 while bar 14 is directed rearwardly and upwardly and connected to the upper end of a leg 9.

Each leg 10 is mounted in a channel shaped guide 16 secured to a circular track 7°. The upper end of said leg is provided with a collar 17 embracing the guide and a pawl 18 adapted to engage any one of a plurality of perforations 19 in said guide is pivotally mounted at 20 in a bifurcated portion of the leg 10. A chain 21 attached to the pawl is directed to the rear portion of the tractor and within easy reach of the operator of said tractor. A pull on the chain releases the pawl and permits the leg 10 to ride in the guide 16.

A disk 22 is secured to the lower end of the leg 10 to prevent the leg from sinking into soft ground. The adjustable legs permit elevation or lowering of the forward end of the lifting device.

A plate 26 riveted to the upper end of the guide 16 is perforated to receive a ring 27 depending from a lug. This lug in turn is riveted to the track 7ª. This arrangement permits the leg to be swung in a manner that it may be placed at an angle to the vertical and brace the track against side sway during operation.

The circular track 7ª is of angle iron construction, is secured to the forward ends of the beams 8 and braced by intermediate bars 23 and a rear end bar 24 connected to the beam 8. An eccentric portion 25 embraced by the main track 7ª carries the bar 24. The track at its periphery is provided with a plurality of spaced grooved pulleys 28 supported by brackets 29 riveted to said track. These pulleys guide a travelling chain 30 driven by a sprocket 31. The ends of said chain are connected to the forward ends of bars 32 which comprise the shovel frame.

The shovel frame bars are secured to lugs 33 carried by a turntable 34 rotatably mounted on the transverse brace bars 23 of the track 7ª. The shovel frame bars 32 have brackets 36 upon which are mounted rollers 35. The rollers in turn ride on the horizontal flange during angular disposition of the shovel frame. It will be noted that the shovel frame is at a higher horizontal level than said track and cleats 30ª depending from the bars 32 provide means for securing the chain 30 in proper alinement with the pulleys 28.

A pivot rod 37 is mounted at the forward ends of the shovel frame bars 32. A pair of lifting arms 38 are pivoted on the rod 37 and have annular extensions 39 carrying grooved pulleys 40 and 41. The outer free ends of the arms 38 converge and carry a grooved pulley 42. On the rod 37 are mounted a pair of pulleys 43 and 44.

A pair of fulcruming arms 45 pivoted on the rod 37 carries a rod 46 intermediate their ends upon which are rotatably mounted a pair of grooved pulleys 47 and 48. The outer free ends of the arms 45 are converged to receive a grooved pulley 49 mounted on a pin 50.

A shovel handle 51 is slidably mounted in a pair of guides 52 and 53. Guide 52 has a pair of ears 54 projecting rearwardly and pivoted on a pin 55 which carries the pulleys 40 and 41. Guide 53 has forwardly projecting ears 56 pivoted on the pin 50 at the outer free ends of the fulcruming arms 45.

A shovel 57 is pivoted by means of ears to the lower end of the handle 51 and is adapted to be tilted normally at an angle to the horizontal. An adjustable tie rod 58 is connected between the upper forward end of the shovel 57 and a lug 59 secured intermediate the ends of the handle.

The driving mechanism is supported by the bearing plates 7 suspended from the beams 8. The shaft 6 drives a gear 61 meshing with a gear 62 which in turn meshes with a gear 63. Gear 62 drives a shaft 64 and when desired a drum 65 through a clutch 66. A fork 67 operated by a shaft 68 actuates the clutch and a collar 69 rigid with the shaft 68 is operated through a link 70 and a bell crank lever 71. A lever 72 pivoted on a shaft 73 is operated by a crank 74 and a link 75 connecting lever 72 with the bell crank lever 71. A brake 76 is applied to the drum 65 and operated through a bell crank lever 77, a link 78, a lever 79, a link 80 and a pedal 81. A pawl 82 engaging a ratchet 83 maintains the pedal 81 in a predetermined position.

The lever 81 is rigid with a shaft 84 carried by brackets on the brace bars 13 and the link 80 is connected to a lever 85 rigid with shaft 84.

The gear 63 drives a shaft 86 upon which are loosely mounted a pair of drums 87 and 88. A clutch 89 connects drum 87 with shaft 86 and is operated by a fork 90 rigid with a sliding shaft 91. A clutch 92 actuated by a fork 93 is also rigid with shaft 91. This shaft is operated through a bell crank lever 94 connected by a link 95 and a collar 96 to shaft 91. A lever 97 pivoted on the rod 73 operates lever 94 through a link 98. Rod 73 is carried by bracket plates 99 depending from the beams 8.

A rock shaft 100 is rotatably mounted in the bearing plates 7 and is actuated through a lever 101, a link 102 and a bell crank lever 103 pivoted at 104 on a brace bar 13. An arrangement similar to the device for operating the brake band 76 is provided and comprises a pedal 105, a pawl 106 and a ratchet 107. Lever 108 on shaft 100 actuates a brake band 109 on pulley 88, while a lever 110 actuates a brake band 111 on pulley 87.

A bracket 112 is secured to the turntable 34 and carries a plurality of grooved pulleys 113, 114, and 115 for a purpose which will be presently explained.

The sprocket 31 is mounted on a shaft 116 carried by a bracket 117 which is bolted to the angle iron bar 24. Another gear 118 is rigid with shaft 116 and is driven by gear 119 or gear 120. A clutch 121 driven by shaft 122 through a key, connects gear 119 to said shaft while a clutch 123 also driven by shaft 122 connects said shaft and gear 120 in operative relation when the clutch is moved by a fork 124 rigid with a sliding rod 125.

A fork 126 actuates clutch 121 and is rigidly connected to rod 125. A common lever 127 pivoted at 128 to the bar 24 and attached to rod 125 through a sleeve 129 operates said rod for shifting simultaneously one clutch into engagement with its respective gear while the other clutch is moved to an inoperative position and vice versa.

The rod 125 and shaft 122 are supported in bearings formed in brackets 130 depending from and secured to the beams 8. The shaft 122 is driven through a sprocket on said shaft and a chain 131 which is driven by a sprocket on the shaft 86.

The turntable 34 has a depending flange 132 at its inner periphery and a nut 133 having a threaded engagement with said flange locks said table against displacement from a plate 134 during turning of said table. The plate is mounted on the beams 8. In a bracket 135 on the turntable is mounted a pulley 136.

A cable 137 which is adjustable is secured to the shovel frame 32 and to the free end of a clevis 138 mounted on a pin 139 secured to the main shovel beams 45. This cable limits the forward movement of said beams.

A cable 140 is secured to the pin 139 entrained on pulley 42 and pulley 49 then directed rearwardly and entrained over pulley 114 and one of the pulleys 136. The end of the cable is directed below and secured to drum 65. When said cable is wound on drum 65, the arms 38 are drawn upwardly until they are positioned adjacent the pin 139, and at the same time forcing the shovel forwardly then upwardly through the rocking motion of arms 39.

A cable 141 is fastened to a perforated lug 142 on the shovel 57 and when operated pulls said shovel outwardly. Said cable travels over pulleys 40, 47, 115 and a pulley 136 and then is directed over the top of drum 87 and secured thereto.

A cable 143 has an end fastened to a perforated lug 144 on the shovel 57, the other end being directed over the top of drum 88 and secured thereto. The intermediate portion of the cable is entrained over pulley 41, under pulley 48, over pulley 113 and about a pulley 136. When the dipper is lowered cables 141 and 143 ride respectively on pulleys 44 and 43. Pulleys 47 and 48 maintain a tension of cables 141 and 143 during operation of the shovel.

A dumping door 145 hinged at 146 to the rear upper end of the shovel provides a means for discharging the materials from the shovel when the same has been elevated and properly positioned. A pin 147 sliding in guides 148 is operated by a cable 149 which has an end located adjacent the operator's seat. When the pin is removed from its usual socket the door will automatically drop.

The operation of my device is as follows:

The shovel and its related parts are shown in operative position in Figure 1. Clutch lever 97 is moved to the left, thrown in clutch 89 and locking drum 87 to shaft 86 whereby a pull is exerted on cable 141 forcing the shovel straight forwardly and thus filling the same. At the forward limit of movement of the shovel or at the completion of the digging operation, power is shut off from cable 141 by reversing the movement of clutch lever 97 to place the clutches 89 and 92 in neutral. It must be borne in mind that when cable 141 is wound on its respective drum cable 143 is unwound from drum 88 to permit slack in cable 143.

Drum 65 is connected to shaft 64 by the shifting of clutch 66 through lever 74 when cable 140 is wound on said drum, raising arms 38 until said arms aline with the main shovel supporting arms 45. At such a disposition of arms 38, the cable 140 pulls both sets of arms 38 and 45 rearwardly until the dipper handle 51 and said arms reach the folded position on top of the main frame and tractor and power is withdrawn from the cable by a neutral position of lever 74 and its respective clutch. The brake bands 76, 109 and 111 are applied as is well known by their associated pedals to hold the respective drums against release of the cables connected to the drums.

Power may be applied to either of the gears 119 or 120 at any time after the completion of the digging operation for swinging the main shovel frame 32 to either the right or left position of the tractor as the case may be for dumping the dirt collected in a wagon. The shifting of the clutch rod 125 will cause a 90° rotation of the turntable 34 and likewise shovel frame 32.

What is claimed is:

1. In a power shovel, a rotatable carriage, frame bars mounted on the carriage, a pair of angularly bent lifting arms pivoted on the frame bars and provided with a guide, a shovel handle provided with a shovel, a pair of lifting bars pivoted on the frame bars and carrying a guide, said handle being slidably mounted in the guides, means for supporting the handle in the guides, and means for operating the angularly bent arms and for tilting the lifting bars, whereby the shovel is moved forwardly and upwardly.

2. In a power shovel, a rotatable carriage, frame bars mounted on the carriage, angularly bent lifting bars pivoted at their bent portions on the outer ends of the frame bars, a guide pivotally connected with the lower ends of the arms, a shovel handle provided with a shovel, a pair of lifting bars pivoted on the frame bars, and carrying a guide, said handle being slidably mounted in the guides, means for supporting the handle in the guides, and means for operating the angularly bent arms and for tilting the lifting bars whereby the shovel is moved forwardly and upwardly.

3. In a power shovel, a rotatable carriage, frame bars mounted on the carriage, a pair of angularly bent lifting arms pivoted on the frame bars and provided with a guide, a shovel handle provided with a shovel, a pair of lifting bars pivoted on the frame bars at the pivotal connection of the lifting arms, and carrying a guide, said handle being slidably mounted in the guides, means for supporting the handle in the guides, and means for operating the angularly bent arms and for tilting the lifting bars whereby the shovel is moved forwardly and upwardly.

4. In a power shovel, a rotatable carriage, frame bars mounted on the carriage, a pair of angularly bent lifting arms pivoted on the frame bars and provided with a guide, a shovel handle provided with a shovel, a pair of lifting bars pivoted on the frame bars and carrying a guide, said handle being slidably mounted in the guides, means for supporting the handle in the guides, means for operating the angularly bent arms and for tilting the lifting bars, whereby the shovel is moved forwardly and upwardly, and means for rotating the carriage whereby the shovel may be swung through an angle of 180°.

5. In a power shovel, a rotatable carriage, frame bars mounted on the carriage, a pair of angularly bent lifting arms pivoted on the frame bars and provided with a guide, a shovel handle provided with a shovel, a pair of lifting bars pivoted on the frame bars and carrying a guide, said handle being slidably mounted in the guides, means for supporting the handle in the guides, means for oscillating the lifting arms to an alining position with the lifting bars, and means for causing the alined lifting arms and bars to be folded back on the frame bars.

6. In a power shovel, a rotatable carriage, frame bars mounted on the carriage, lifting arms having a lower portion bent at an angle to an upper portion and pivoted on the frame bars, a guide pivoted to the lower portions of the arms, lifting bars pivoted on the frame bars, a guide pivoted on the upper ends of the lifting bars, a shovel handle provided with a shovel slidably mounted in the guides, means for sustaining the handle in the guides, means for moving the upper portions of the lifting arms to alining position with the lifting bars, and means for causing the alined lifting arms and bars to be moved to a reclining position on the frame bars.

7. In a power shovel, a rotatable carriage, frame bars mounted on the carriage, lifting arms having a lower portion bent at an angle to an upper portion and pivoted on the frame bars, a guide to the lower portions of the arms, lifting bars pivoted on the frame bars, a guide pivoted on the upper ends of the lifting bars, a shovel handle provided with a shovel slidably mounted on the guides, means for sustaining the handle in the guides, means for oscillating the upper portions of the lifting arms to an elevated position whereby the shovel is moved forwardly and upwardly, said sustaining means at this time permitting lowering of the shovel in the guides, and means for causing the lifting bars and arms to be oscillated to a reclining position on the frame bars.

8. In a power shovel, a rotatable carriage, frame bars mounted on the carriage, lifting arms having a lower portion bent at an angle to an upper portion and pivoted on the frame bars, a guide pivoted to the lower portions of the arms, lifting bars pivoted on the frame bars, a guide pivoted on the upper ends of the lifting bars, a shovel handle provided with a shovel slidably mounted in the guides, means for sustaining the handle in the guides, means for moving the upper portions of the lifting arms to alining position with the lifting bars, means for causing the alined lifting arms and bars to be moved to a reclining position on the frame bars, and means for causing rotation of the carriage.

9. In a power shovel, a rotatable carriage, frame bars mounted on the carriage, lifting arms having a lower portion bent at an angle to an upper portion and pivoted on the frame bars, a guide pivoted to the lower portions of the arms, lifting bars pivoted on the frame bars, a guide pivoted on the upper ends of the lifting bars, a shovel handle pivoted with a shovel slidably mounted on the guides, means for sustaining the handle in the guides, means for oscillating the upper portions of the lifting arms to an elevated position whereby the shovel is moved forwardly and upwardly, said sustaining means at this time permitting lowering of the shovel in the guides, and means for causing the lifting bars and arms to be oscillated to a reclining position on the frame bars, said shovel arm being carried to a reclining position on the carriage, and means for simultaneously rotating the table when the lifting arms and bars are oscillated to a reclining position on the carriage.

10. In a power shovel, a rotatable carriage, frame bars mounted on the carriage, lifting arms having a lower portion bent at an angle to an upper portion and pivoted on the frame bars, a guide pivoted to the lower portions of the arms, lifting bars pivoted on the frame bars, a guide pivoted on the upper ends of the lifting bars, a shovel handle provided with a shovel slidably mounted in the guides, means for sustaining the handle in the guides, means for moving the upper portions of the lifting arms to alining position with the lifting bars, means for causing the alined lifting arms and bars to be moved to a reclining position in the frame bars, and means for retaining the lifting arms in an elevated position.

11. In a power shovel, a rotatable carriage, frame bars mounted on the carriage, lifting arms having a lower portion bent at an angle to an upper portion and pivoted on the frame bars, a guide pivoted to the lower portions of the arms, lifting bars pivoted on the frame bars, a guide pivoted on the upper ends of the lifting bars, a shovel handle provided with a shovel slidably mounted in the guides, means for sustaining the handle in the guides, pulleys mounted on the upper ends of the lifting bars and on the outer ends of the upper portions of the lifting arms, a drum, means for operating the drum, a cable connected to the lifting bars and entrained around the pulleys and connected to the drum, whereby rotation of the drum causes the upper portion of the lifting arms to be alined with the lifting bars, and means for moving the alined lifting bars and arms to a reclining position on the carriage.

12. In a power shovel, a rotatable carriage, frame bars mounted on the carriage, lifting arms having a lower portion bent at an angle to an upper portion and pivoted on the frame bars, a guide pivoted to the lower portions of the arms, lifting bars pivoted on the frame bars, a guide pivoted on the upper ends of the lifting bars, a shovel handle provided with a shovel slidably mounted in the guides, means for sustaining the handle in the guides, means for moving the upper portions of the lifting arms to alining position with the lifting bars, means for causing the alined lifting arms and bars to be moved to a reclining position on the frame bars, and means for limiting movement of the lifting bars in one direction.

13. In a power shovel, a rotatable carriage, frame bars mounted on the carriage, lifting arms having a lower portion bent at an angle to an upper portion and pivoted on the frame bars, a guide pivoted to the lower portion of the arms, lifting bars pivoted on the frame bars, a guide pivoted on the upper ends of the lifting bars, a shovel handle provided with a shovel slidably mounted on the guides, means for sustaining the handle in the guides, means for oscillating the upper portions of the lifting arms to an elevated position whereby the shovel is moved forwardly and upwardly, said sustaining means at this time permitting lowering of the shovel in the guides, and means for causing the lifting bars and arms to be oscillated to a reclining position on the frame bars, and a cable connected to the carriage and upper ends of the lifting bars for limiting outward movement of the lifting bars.

14. In a power shovel, the combination of a tractor having a power plant, a frame mounted on the tractor and provided with a track, a carriage pivotally mounted on the frame and provided with rollers engaging the track, frame bars secured to the carriage, angularly bent lifting arms pivoted to the frame bars and provided with a guide, a shovel handle provided with a shovel, a pair of lifting bars pivoted on the frame bars and carrying a guide, said handle being slidably mounted in the guides, means for supporting the handle in the guides, and means for operating the angularly bent arms and for tilting the lifting bars whereby the shovel is moved forwardly and upwardly.

15. In a power shovel, the combination of a tractor having a power plant, a frame mounted on the tractor and provided with a track, a carriage pivotally mounted on the frame and provided with rollers engaging the track, frame bars secured to the carriage, angularly bent lifting arms pivoted to the frame bars and provided with a guide, lifting bars provided with a guide and pivotally connected with the frame bars, a handle slidably mounted in the guides and provided with a shovel, pulleys carried by the lifting arms and bars, a cable connected to the lifting bars and entrained over the pulleys, and a drum operatively connected with the power plant and the cable for winding the cable and oscillating the lifting arms and bars whereby the shovel is lifted.

16. In a power shovel, the combination of a tractor having a power plant, a frame mounted on the tractor and provided with a track, a carriage pivotally mounted on the frame and provided with rollers engaging the track, frame bars secured to the carriage, angularly bent lifting arms pivoted to the frame bars and provided with a guide, lifting bars provided with a guide and pivotally connected with the frame bars, a handle slidably mounted in the guides and provided with a shovel, pulleys carried by the lifting arms and bars, a cable connected to the lifting bars and entrained over the pulleys, a drum operatively connected with the power plant and the cable for winding the cable and oscillating the lifting arms and bars whereby the shovel is lifted, and means for causing the lifting arms and bars to assume a reclining position on the carriage.

17. In a power shovel, the combination of a tractor having a power plant, a frame mounted on the tractor and provided with a track, a carriage pivotally mounted on the frame and provided with rollers engaging the track, frame bars secured to the carriage, angularly bent lifting arms pivoted to the frame bars and provided with a guide, lifting bars provided with a guide and pivotally connected with the frame bars, a handle slidably mounted in the guides and provided with a shovel, pulleys carried by the lifting arms and bars, a cable connected to the lifting bars and entrained over the pulleys, a drum operatively connected with the power plant and the cable for winding the cable and oscillating the lifting arms and bars whereby the shovel is lifted, a cable connected to the shovel, a drum driven by the power plant and connected to the last-mentioned cable for causing elevation or lowering of the handle in the guides and for sustaining the shovel in a predetermined vertical position.

JOHN ADAM SCHARF.